(12) United States Patent
Wang et al.

(10) Patent No.: US 12,204,131 B2
(45) Date of Patent: Jan. 21, 2025

(54) BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yaodong Wang, Beijing (CN); Luo Zhang, Beijing (CN); Yangli Zheng, Beijing (CN); Xiaoping Zhang, Beijing (CN); Jian Ren, Beijing (CN); Fangyi Liu, Beijing (CN); Xiaojuan Gao, Beijing (CN); Zhenguo Zhou, Beijing (CN); Siqi Yin, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/286,463

(22) PCT Filed: Jan. 10, 2023

(86) PCT No.: PCT/CN2023/071561
§ 371 (c)(1),
(2) Date: Oct. 11, 2023

(87) PCT Pub. No.: WO2023/138439
PCT Pub. Date: Jul. 27, 2023

(65) Prior Publication Data
US 2024/0248247 A1  Jul. 25, 2024

(30) Foreign Application Priority Data

Jan. 24, 2022 (CN) .......................... 202210079805.4

(51) Int. Cl.
*F21V 8/00* (2006.01)
(52) U.S. Cl.
CPC ........... *G02B 6/002* (2013.01); *G02B 6/0043* (2013.01)
(58) Field of Classification Search
CPC ..... G02B 6/0046; G02B 6/0043; G02B 6/002
See application file for complete search history.

(56) References Cited

U.S. PATENT DOCUMENTS 10,018,778 B2 *  7/2018  Kim ..................... G02B 6/0088
2005/0286854 A1  12/2005  Honma et al.
(Continued)

FOREIGN PATENT DOCUMENTS

CN  100552511 C  10/2009
CN  202150000 U   2/2012
(Continued)

*Primary Examiner* — Karabi Guharay
(74) *Attorney, Agent, or Firm* — WHDA, LLP (57) ABSTRACT

Backlight module and display device are disclosed. The backlight module includes a light source structure and a light guide plate, which includes a body structure and a wedge-shaped structure disposed on the body structure and located at a side adjacent to the light source structure. The body structure includes a light incident surface of body structure. The wedge-shaped structure includes a bottom surface, a wedge surface and a light incident surface of wedge-shaped structure. The light source structure includes a light source, light emitted by which enters the light guide plate through the light incident surface of body structure and the light incident surface of wedge-shaped structure. In a direction perpendicular to the bottom surface, a ratio of thickness of the body structure to thickness of light-exiting surface of the light source is less than or equal to 88%.

20 Claims, 5 Drawing Sheets

(56) References Cited

U.S. PATENT DOCUMENTS

| | | | |
|---|---|---|---|
| 2008/0112185 A1 | 5/2008 | Noh et al. |
| 2015/0055372 A1 | 2/2015 | Wu et al. |
| 2015/0378083 A1 | 12/2015 | Takakusaki |
| 2017/0184784 A1 | 6/2017 | Kim |
| 2022/0171239 A1 | 6/2022 | Wang et al. |

FOREIGN PATENT DOCUMENTS

| | | | |
|---|---|---|---|
| CN | 103792729 A | 5/2014 |
| CN | 204667010 U | 9/2015 |
| CN | 104965255 A | 10/2015 |
| CN | 106932957 A | 7/2017 |
| CN | 206741160 U | 12/2017 |
| CN | 105276441 B | 1/2018 |
| CN | 207516697 U | 6/2018 |
| CN | 110109218 A | 8/2019 |
| CN | 209373170 U | 9/2019 |
| CN | 209606651 U | 11/2019 |
| CN | 212675216 U | 3/2021 |
| CN | 113075807 A | 7/2021 |
| CN | 213904010 U | 8/2021 |
| CN | 113721388 A | 11/2021 |
| CN | 217587811 U | 10/2022 |
| JP | 2009-053472 A | 3/2009 |
| WO | 2019/100318 A1 | 5/2019 |

\* cited by examiner

FIG. 9

BACKLIGHT MODULE AND DISPLAY DEVICE

CROSS-REFERENCE TO RELATED APPLICATION

The present application is the U.S. national phase of PCT Application No. PCT/CN2023/071561 filed on Jan. 10, 2023, which is incorporated herein by reference in its entirety.

TECHNICAL FIELD

The present disclosure relates to the technical field of displaying, and in particular, to a backlight module and a display device.

BACKGROUND

With the developing of display technology, the application range of liquid crystal display products is broader. The liquid crystal display product mainly includes a display panel and a backlight module. The backlight module is configured for providing backlight for the display panel, so as to ensure a normal display function of the display panel.

The backlight module generally includes a light source and a light guide plate, and with regard to a side-entry manner in which the backlight enters from side, the light source is disposed at a side surface of the light guide plate, so that the light emitted by the light source are emitted into the light guide plate from the side surface of the light guide plate. However, for a side-entry backlight module in related art, when the thickness of the backlight module is thinning, a thickness of the light guide plate cannot be well matched with a size of a light outlet of the light source.

SUMMARY

The present disclosure is to provide a backlight module and a display device.

The present disclosure provides the following technical solution.

In a first aspect of the present disclosure, a backlight module is provided, including: a light source structure and a light guide plate:

the light guide plate includes: a body structure and a wedge-shaped structure disposed on the body structure and located at a side adjacent to the light source structure:

the body structure includes a light incident surface of the body structure: the wedge-shaped structure includes a bottom surface, a wedge surface and a light incident surface of the wedge-shaped structure, the bottom surface is disposed in surface contact with the body structure, the light incident surface of the wedge-shaped structure, the wedge surface and the bottom surface form a protrusion on the body structure, and a thickness of the wedge-shaped structure gradually decreases in a direction from the light incident surface of the body structure, extending along the body structure and away from the light source structure;

the light source structure includes: a light source and a carrier carrying the light source: the light incident surface of the body structure is located at a side of the body structure facing the light source, and the light incident surface of the wedge-shaped structure is located at a side of the wedge-shaped structure facing the light source; a light emitted by the light source enter the light guide plate through the light incident surface of the body structure and the light incident surface of the wedge-shaped structure; in a direction perpendicular to the bottom surface, a ratio of a thickness of the body structure to a thickness of a light-exiting surface of the light source is less than or equal to 88%.

Optionally, in a direction perpendicular to a light-exiting surface of the body structure, a maximum thickness d1 of the body structure satisfies: $0.24 \text{ mm} \leq d1 \leq 0.32 \text{ mm}$; and a distance d4 between the light incident surface of the body structure and a boundary of a light-exiting area of the backlight module satisfies: $d4 \leq 1.65 \text{ mm}$.

Optionally, in the direction perpendicular to the bottom surface, a maximum thickness F of the wedge-shaped structure satisfies: $F \leq 0.04 \text{ mm}$;

in the direction perpendicular to the light-exiting surface of the body structure, a maximum thickness d2 of the light guide plate satisfies: $0.27 \text{ mm} \leq d2 \leq 0.33 \text{ mm}$;

a length d3 of an orthographic projection of a first edge of the wedge surface onto the bottom surface satisfies: $0.3 \text{ mm} \leq d3 \leq 0.55 \text{ mm}$, and an included angle between the first edge and the light incident surface of the wedge-shaped structure is greater than 0 degrees; and an included angle Z between the wedge surface and the bottom surface satisfies: $Z \leq 4.5$ degrees.

Optionally, a plurality of first microstructures is disposed on the light-exiting surface of the body structure, the plurality of first microstructures is arranged along a direction parallel to the light incident surface of the body structure, and each of the plurality of first microstructures on the light-exiting surface of the body structure extends in a direction that is perpendicular to a direction for arranging the plurality of the first microstructures:

a cross section of the first microstructure, along the direction for arranging the plurality of the first microstructures and in the direction perpendicular to the light-exiting surface, has a first arc shape, and a radius R1 of the first arc shape satisfies: $80 \text{ μm} \leq R1 \leq 100 \text{ μm}$;

a distance P1 between centers of two adjacent first microstructures satisfies: $140 \text{ μm} \leq P1 \leq 160 \text{ μm}$; and in the direction perpendicular to the light-exiting surface, a maximum height H1 of the first microstructure satisfies: $2.2 \text{ μm} \leq H1 \leq 2.6 \text{ μm}$.

Optionally, a plurality of second microstructures is disposed on the wedge surface, the plurality of second microstructures is arranged in a direction parallel to the light incident surface of the wedge-shaped structure, and the second microstructure on the wedge surface extends in a direction that is perpendicular to a direction for arranging the plurality of second microstructures;

a cross section of the second microstructure, along the direction for arranging the plurality of second microstructures and in a direction perpendicular to the wedge surface, has a second arc shape, a radius R2 of the second arc shape satisfies: $80 \text{ μm} \leq R2 \leq 100 \text{ μm}$;

a distance P2 between centers of two adjacent second microstructures satisfies: $34 \text{ μm} \leq P2 \leq 44 \text{ μm}$; and in the direction perpendicular to the wedge surface, a maximum height H2 of the second microstructure satisfies: $1.8 \text{ μm} \leq H2 \leq 2.2 \text{ μm}$.

Optionally, the light incident surface of the wedge-shaped structure and the light incident surface of the body structure are coplanar to be a light incident surface of the light guide plate: a plurality of third microstructures is disposed on the light incident surface of the light guide plate, the plurality of third microstructures is arranged in a direction parallel to the light-exiting surface of the body structure, and the third microstructure extend in a direction that is perpendicular to a direction for arranging the plurality of third microstructures;

a cross section of the third microstructure, along the direction for arranging the plurality of third microstructures and in a direction perpendicular to the light incident surface, has a third arc shape, a radius R3 of the third arc shape satisfies: 90 µm≤R3≤110 µm;

a distance P3 between centers of two adjacent third microstructures satisfies: 340 µm≤P3≤360 µm; and     in the direction perpendicular to the light incident surface, a maximum height H3 of the third microstructure satisfies: 29.5 µm≤H3≤30.5 µm.

Optionally, the backlight module further includes: an optical film, a support black bar and a light-shielding film: the optical film and the support black bar are located on a light-exiting surface of the body structure, and at least a portion of the support black bar is located between the wedge surface and the optical film: a first portion of the light-shielding film is located between the support black bar and the light-exiting surface, and a second portion of the light-shielding film is located between the optical film and the light-exiting surface:

a distance d5 between the optical film and the support black bar satisfies: 0≤d5≤0.1 mm;

a thickness d6 of the support black bar satisfies: 0.12 mm≤d6≤0.15 mm; and     a thickness d7 of the light-shielding film satisfies: 0.013 mm≤d7≤0.017 mm.

Optionally, the backlight module further includes:

a reflective sheet, located at a side of the body structure facing away from the light-exiting surface; and where a first portion of the carrier is located at a side of the body structure facing away from the light-exiting surface, and a distance d8 between an orthographic projection of the first portion of the carrier onto the body structure and an orthographic projection of the reflective sheet onto the body structure satisfies: 0.1 mm≤d8≤0.3 mm.

Optionally, the backlight module further includes:

a housing, where the light source structure, the light guide plate and the reflective sheet are located inside the housing, and an opening of the housing faces to a light-exiting side of the backlight module; a thickness d9 of a bottom of the housing satisfies: 0.065 mm≤d9≤0.075 mm; and a mold frame, where at least a portion of the mold frame and the light source structure are located at a same side of the light guide plate, the mold frame is bonded to the housing, a flatness of a middle portion of the mold frame is less than 0.15 mm, and a flatness of an edge portion of the mold frame is less than 0.35 mm.

Optionally, the body structure and the wedge-shaped structure are one-piece structure.

Optionally, the light incident surface of the wedge-shaped structure and the light incident surface of the body structure are a continuous surface.

Optionally, at least a portion of the carrier is located at a side of the body structure facing away from the bottom surface.

Optionally, a ratio of a thickness of the body structure to an overall thickness of the light source is less than or equal to 75%.

Optionally, at a light-exiting side of the light guide plate, the light-exiting surface of the light source protrudes with respect to the wedge-shaped structure; and/or at a non-light-exiting side of the light guide plate opposite to the light-exiting side, the light-exiting surface of the light source protrudes with respect to the body structure.

Optionally, P3>P2>P1.

Optionally, on a non-light-exiting surface of the body structure facing away from the wedge-shaped structure, the body structure comprises a first region and a second region disposed to be adjacent to the light source in a direction away from an extending direction of light source arrangement: wherein an extending direction of a boundary line between the first region and the second region is the same as the extending direction of light source arrangement; and the first region includes a plurality of arch regions disposed along a direction of arrangement, each arch region is in one-to-one correspondence to a corresponding light source, a bottom of the arch region is disposed to be adjacent to the light source, and orthographic projections of two arch feet of the arch region onto the light-exiting surface of the light source is located inside the light-exiting surface: in the first region, an average density of dots in the arch region is less than an average density of dots in a region outside the arch region.

Optionally, the second region further includes a first sub-region and a second sub-region, the first sub-region is located between the first region and the second sub-region, and an average density of dots in the first sub-region is greater than an average density of dots in the second sub-region.

Based on the technical solution of the backlight module as mentioned above, in a second aspect of the present disclosure, a display device is provided, including the above-mentioned backlight module, where the display device further includes a display panel, and the display panel is located at a light-exiting side of the backlight module.

BRIEF DESCRIPTION OF THE DRAWINGS

The accompanying drawings are to provide a further understanding of the present disclosure and are incorporated in and form a part of the present disclosure, illustrative embodiments of the present disclosure and the description thereof are to explain the disclosure and do not form an undue limitation on the disclosure.

DETAILED DESCRIPTION

In order to further explain the backlight module and the display device provided by embodiments of the present disclosure, the following detailed description is given in conjunction with the accompanying drawings.

Figure 1:
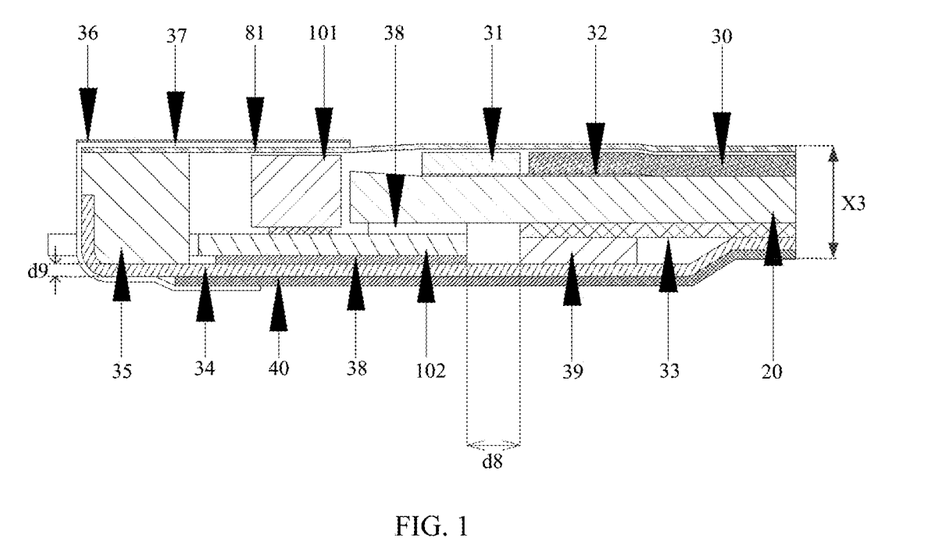
FIG. 1 is a schematic sectional view of a backlight module provided in an embodiment of the present disclosure.
Figure 2:
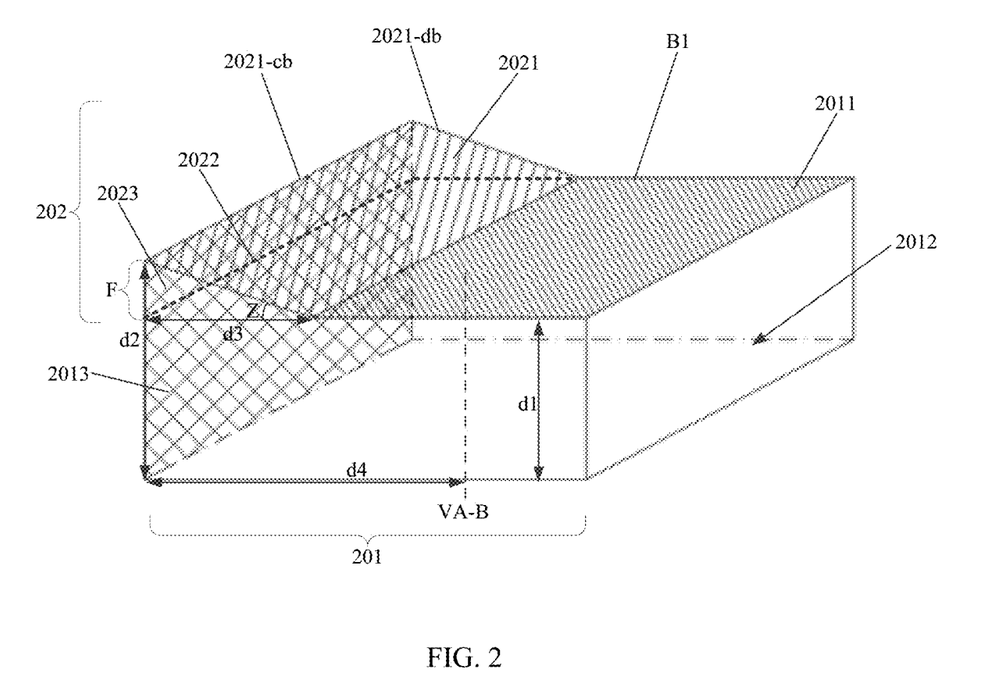
FIG. 2 is a schematic structural diagram of a light guide plate provided in an embodiment of the present disclosure.
Figure 8:
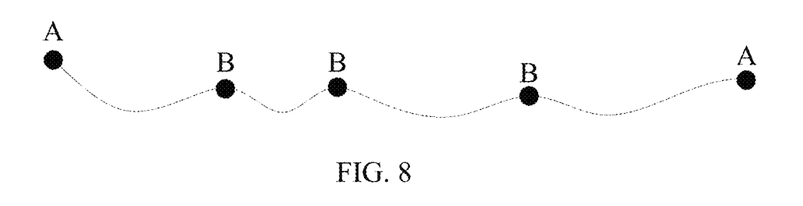
FIG. 8 is a schematic diagram of flatness provided in an embodiment of the present disclosure.

With reference to FIGS. 1, 2 and 8, an embodiment of the present disclosure provides a backlight module BLU, including: a light source structure and a light guide plate 20.

The light guide plate 20 includes a body structure 201 and a wedge-shaped structure 202. The wedge-shaped structure 202 is disposed on the body structure 201 and located at a side near the light source structure.

The body structure 201 includes a light incident surface 2013 of the body structure. The wedge-shaped structure 202 includes a bottom surface 2022, a wedge surface 2021 and a light incident surface 2023 of the wedge-shaped structure. The bottom surface 2022 is disposed in surface-to-surface contact with the body structure 201. The light incident surface 2023 of the wedge-shaped structure, the wedge surface 2021 and the bottom surface 2022 form a protrusion on the body structure 201, and a thickness of the wedge-shaped structure 202 gradually decreases a direction from the light incident surface 2013 of the body structure, extending along the body structure 201 and away from the light source structure.

The light source structure includes: a light source 101 and a carrier 102 bearing the light source. The light incident surface 2013 of the body structure is located at a side of the body structure 201 facing the light source 101, and the light incident surface 2023 of the wedge-shaped structure is located at a side of the wedge-shaped structure 202 facing the light source 101. Lights emitted by the light source 101 enter the light guide plate 20 through the light incident surface 2013 of the body structure and the light incident surface 2023 of the wedge-shaped structure. In a direction perpendicular to the bottom surface 2022, a ratio of a thickness of the body structure to a thickness of a light-exiting surface of the light source is less than 88%.

Illustratively, the light guide plate 20 is made of a resin material.

Illustratively, the light guide plate 20 may be molded in a single cavity by using one compression mold, or molded in two cavities by using one compression mold.

Illustratively, the wedge-shaped structure 202 is formed as a one-piece structure with the body structure 201.

Illustratively, the wedge surface 2021 is connected to a light-exiting surface 2011 of the body structure 201, and the bottom surface 2022 of the wedge-shaped structure 202 is disposed to be in surface-to-surface contact with the light-exiting surface 2011 of the body structure 201.

Illustratively, a side surface of the wedge-shaped structure 202 is connected to a side surface of the body structure 201.

Illustratively, the thickness of the wedge-shaped structure 202 tends to decrease gradually in a direction along which the body structure 201 extends, from the light incident surface 2013 of the body structure away from the light source structure. Illustratively, in a direction along which the body structure 201 extends, from the light incident surface 2013 of the body structure away from the light source structure, the thickness of the wedge-shaped structure 202 is in a negatively correlation with its distance to the light source structure. It should be noted that in a case that other optical modulation structures are provided on the wedge-shaped structure 202, the negatively correlation may be a not strict linear relationship, but an overall trend for the thickness of the wedge-shaped structure is a negative correlation. A linear correlation is also applicable.

Illustratively, the light source 101 includes a LED light source. The carrier 102 includes a flexible circuit board. Illustratively, the LED light source may be a LED having a thickness of 0.4 mm in a direction perpendicular to the carrier 102.

Illustratively, at least a portion of the carrier 102 is located at a side of the body structure 201 facing away from the wedge surface 2021. At least a portion of the carrier 102 is located at the side of the light guide plate facing away from the light-exiting surface 2011. The carrier 102 and the non-light-exiting surface 2012 (namely, a surface of the light guide plate at the side facing away from the light-exiting surface 2011) are bonded together via a light bar glue 38.

Illustratively, the bottom surface 2022 is in surface-to-surface with the light-exiting surface 2011, i.e., a portion of the light-exiting surface 2011 can be considered to be the bottom surface 2022. It should be noted that when the wedge-shaped structure 202 and the body structure 201 are one-piece structure, there is no distinct interface between the wedge-shaped structure 202 and the body structure 201, and the bottom surface 2022 and the light-exiting surface which is in surface-to-surface contact with the bottom surface 2022 are defined for illustration purpose.

Figure 7:
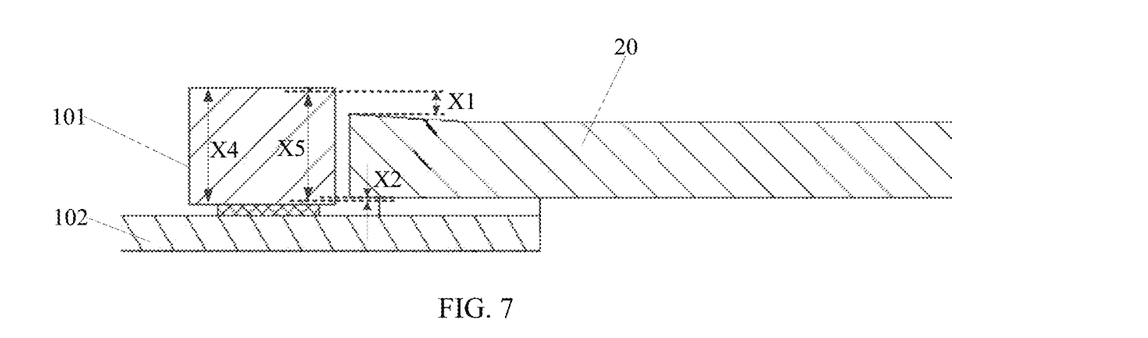
FIG. 7 is a schematic diagram of a light source structure and a light guide plate provided in an embodiment of the present disclosure.

As shown in FIG. 7, at a light-exiting side of the light guide plate 20, a height of the light-exiting surface of the light source protruding with respect to the wedge-shaped structure 202 of the light guide plate 20 is X1, and at a side of the light guide plate 20 opposite to the light-exiting side, a height of the light-exiting surface of the light source protruding with respect to the body structure 201 of the light guide plate 20 is X2. The overall thickness of the light source is X4. The height of the light-exiting surface of the light source is X5.

Note that the overall thickness of the light source refers to the thickness of the light source including the housing.

In the backlight module BLU provided by the embodiments of the present disclosure, by arranging the light guide plate 20 to include the wedge-shaped structure 202 and the body structure 201, it is realized that the thickness of the backlight module BLU as a whole can be effectively reduced by thinning the body structure 201 in the direction perpendicular to the bottom surface 2022. In addition, by arranging the light guide plate 20 to include the wedge-shaped structure 202 and the body structure 201, and in the direction perpendicular to the bottom surface 2022, arranging the ratio of the thickness of the body structure to the thickness of the light-exiting surface of the light source to be less than 88%, the light emitted by the light source can enter the wedge-shaped structure 202 to a greater extent, and is further transmitted from the wedge-shaped structure to the body structure, thereby ensuring the light incidence rate at the light incident surface of the light guide plate, improving the light utilization rate, and ensuring that the wedge-shaped structure 202 having a well matching with the size of the light outlet of the light source 101.

As shown in FIGS. 1 and 2, in some embodiments, at least a portion of the carrier 102 is disposed at a side of the body structure 201 facing away from the bottom surface 2022.

With this arrangement, the carrier 102 can be bonded on a flat surface of the light guide plate 20 (namely, the surface of the body structure 201 at a side facing away from the bottom surface 2022), thereby ensuring that the light source structure and the light guide plate 20 can be firmly bonded. Since the optical film 30 is disposed on the side where the light-exiting surface 2011 is located, the above-mentioned arrangement avoids the carrier 102 occupying the layout space of the optical film 30, and ensures that the optical film 30 has a sufficient layout space.

As shown in FIG. 2, in some embodiments, a maximum thickness d1 of the body structure 201 in a direction perpendicular to the light-exiting surface 2011 of the body structure 201 satisfies: 0.24 mm≤d1≤0.32 mm (millimeter).

A distance d4 between the light incident surface 2013 of the body structure and a boundary VA-B of a light-exiting area VA of the backlight module BLU satisfies: d4≤1.65 mm.

Illustratively, d1 satisfies: 0.26 mm≤d1≤0.30 mm.

Illustratively, the thickness d1 of the body structure 201 may be 0.24 mm, 0.25 mm, 0.26 mm, 0.27 mm, or 0.28 mm, etc.

Illustratively, the distance d4 between the light incident surface 2013 of the body structure and the boundary of the light-exiting area of the backlight module BLU may be 1.3 mm, 1.4 mm, 1.5 mm or 1.55 mm, etc.

In the backlight module BLU provided in the above-mentioned embodiment, by setting d1 and d4 in the above-mentioned range, the body structure 201 can have a relatively thin thickness, thereby facilitating the reduction of the overall thickness of the backlight module. In addition, the frame of the backlight module BLU can be made narrower for a better use experience. It also enables the wedge-shaped structure 202 to have a well matching with the size of the light outlet of the light source 101.

As shown in FIG. 2, in some embodiments, in a direction perpendicular to the bottom surface 2022, a maximum thickness F of the wedge-shaped structure 202 satisfies: F≤0.04 mm.

In a direction perpendicular to the light-exiting surface 2011 of the body structure 201, a maximum thickness d2 of the light guide plate satisfies: 0.27 mm≤d2≤0.33 mm.

A length d3 of an orthographic projection of a first edge 2021-db of the wedge surface 2021 onto the bottom surface 2022 satisfies: 0.3 mm≤d3≤0.55 mm, and an included angle between the first edge and the light incident surface of the wedge-shaped structure is greater than 0 degrees.

An included angle Z between the wedge surface and the bottom surface satisfies: Z≤4.5° (degrees).

Illustratively, in the direction perpendicular to the carrier, the thickness of the light source is more than 0.1 mm greater than d1.

Illustratively, the maximum thickness d2 of the wedge-shaped structure 202 may be 0.27 mm, 0.28 mm, 0.29 mm, 0.30 mm, or 0.31 mm, etc.

Illustratively, the length d3 of the orthographic projection of the first edge 2021-db of the wedge surface 2021 onto the bottom surface 2022 may be 0.4 mm, or 0.5 mm, etc.

The inventor has found that when d2 and d3 are set in the above-mentioned range, the light-exiting effect at the lamp port can be better. As a comparative example, when setting d2=0.29 mm and d3=1 mm, there is a medium bright band at the lamp port between the light source 101 and the light guide plate 20. When setting d2=0.34 mm and d3=0.4 mm, there is a vertical bar shadow at the lamp port. When setting d2=0.36 mm and d3=0.4 mm, there is a vertical bar shadow at the lamp port. When setting d2=0.36 mm and d3=1 mm, there is an abnormal lamp eye phenomenon at lamp port.

Figure 3:
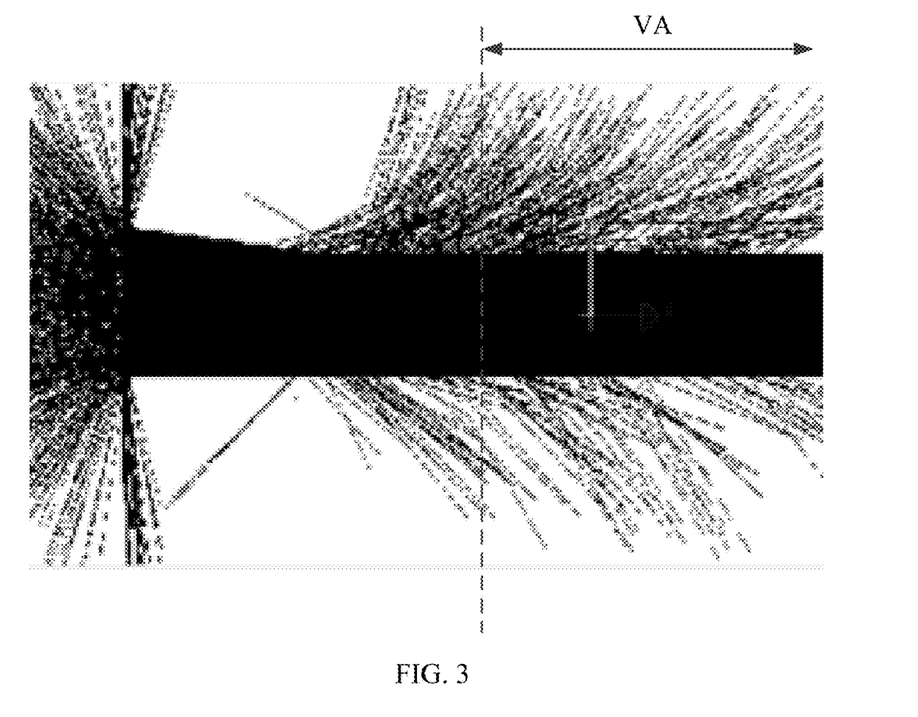
FIG. 3 is a diagram showing a lamp port effect when a maximum mismatch formed by a wedge surface is 0.1 mm in a related art.
Figure 4:
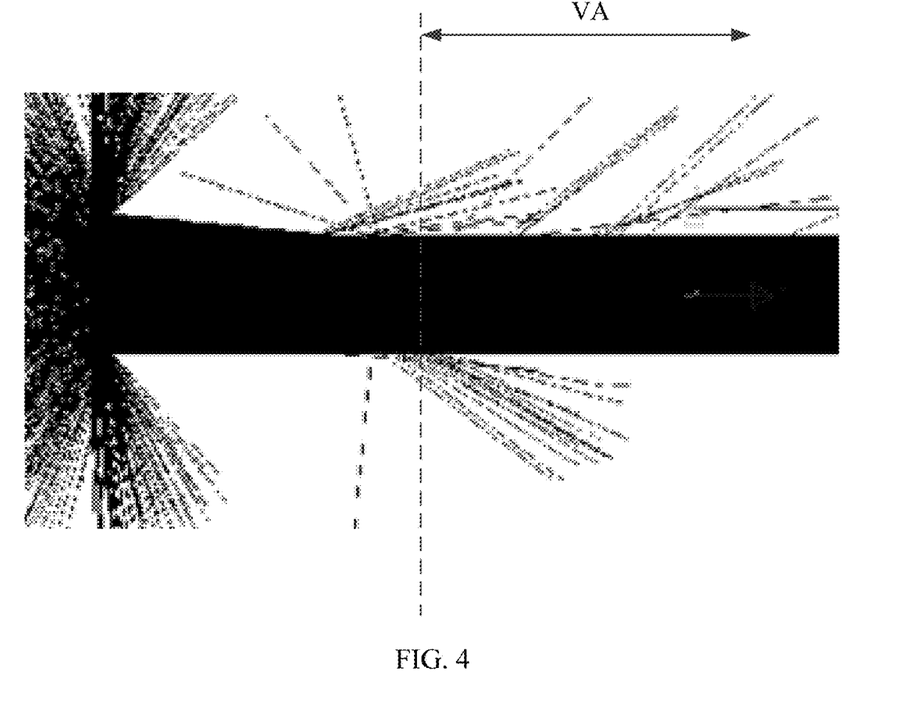
FIG. 4 is a diagram showing a lamp port effect when a maximum mismatch formed by a wedge surface is 0.03 mm according to the embodiment of the present disclosure.

FIG. 3 is a diagram showing a lamp port effect corresponding to a case where a maximum mismatch formed by the wedge surface is 0.1 mm in the related art. FIG. 4 is a diagram showing a lamp port effect corresponding to a case where a maximum mismatch formed by the wedge surface is 0.03 mm according to an embodiment of the present disclosure. Note that the test conditions for FIG. 3 and FIG. 4 are the same.

In FIG. 3, a large amount of light emitted by the light source 101 will be emitted to the light-exiting surface 2011 of the light guide plate 20 before entering the light-exiting area VA of the backlight module BLU (VA-B is a boundary of the light-exiting area VA), resulting in uneven brightness and darkness at the lamp port. In FIG. 4, the light emitted by the light source 101 will not be emitted to the light-exiting surface 2011 of the light guide plate 20 in large amount before entering the light-exiting area VA of the backlight module BLU, so as to ensure an optimal lamp port effect, and the phenomenon of uneven brightness and darkness at the lamp port will not occur.

It should be noted that there is a positive correlation between the brightness and intensity of the emitted light. Thus, In FIG. 3, there is a greater brightness in the vicinity of the lamp port than that in FIG. 4.

By arranging the light guide plate 20 according to the above parameters, the wedge-shaped structure 202 can be well matched with the size of the light outlet of the light source 101. In addition, the above-mentioned arrangement controls the segment difference between the wedge surface 2021 and the light-exiting surface 2011 to be within a reasonable range, so that the light emitted by the light source 101 will not emit to the light-exiting surface 2011 of the light guide plate 20 in large amount before entering the light-exiting area VA of the backlight module BLU, thereby ensuring an optimal lamp port effect, and preventing uneven brightness and darkness at the lamp port.

Figure 5A:
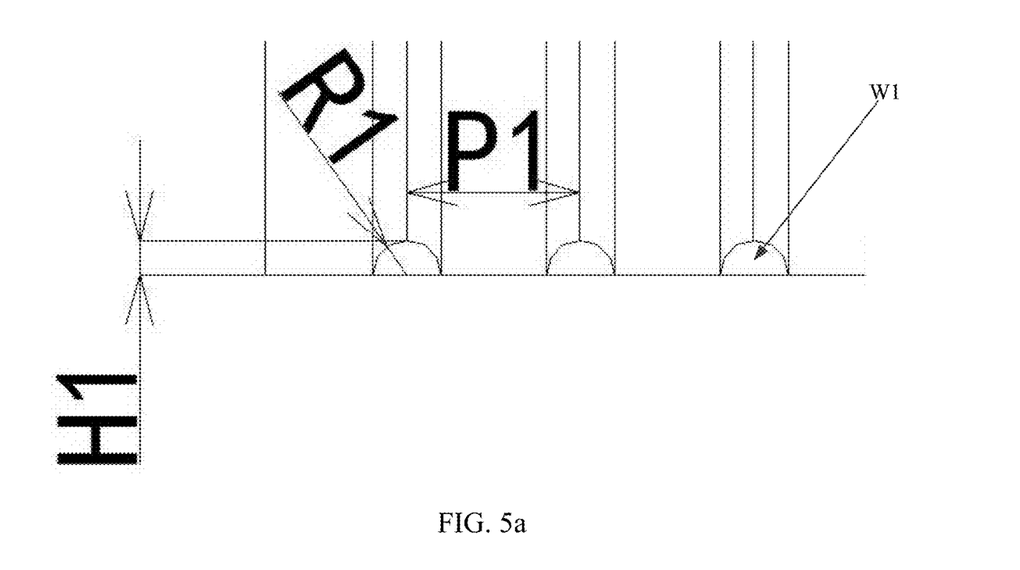
FIG. 5a is a schematic diagram of a size and a layout of first microstructures provided in an embodiment of the present disclosure.

As shown in FIGS. 2 and 5a, in some embodiments, multiple first microstructures W1 are disposed on the light-exiting surface 2011 of the body structure 201, the multiple first microstructures W1 are arranged along a direction parallel to the light incident surface 2013 of the body structure (such as a direction in which a second edge 2021-cb extend), and each first microstructure W1 eon the light-exiting surface 2011 of the body structure extends in a direction perpendicular to the direction along which the multiple first microstructures W1 are arranged.

A cross section of the first microstructure W1, along the direction in which the multiple first microstructures W1 are arranged and in the direction perpendicular to the light-exiting surface 2011, is a first arc shape, a radius R1 of the first arc shape satisfies: 80 μm≤R1≤100 μm (micron).

A distance P1 between the centers of two adjacent first microstructures W1 satisfies: 140 μm≤P1≤160 μm.

A maximum height H1 of the first microstructure W1 in a direction perpendicular to the light-exiting surface 2011 satisfies: 2.2 μm≤H1≤2.6 μm.

Illustratively, the radius R1 of the first arc shape is 85 μm, 90 μm or 95 μm, etc.

Illustratively, the distance P1 between the centers of two adjacent first microstructures W1 is: 145 μm, 150 μm or 155 μm, etc.

Illustratively, the maximum height H1 of the first microstructure W1 in the direction perpendicular to the light-exiting surface 2011 may be: 2.3 μm, 2.4 μm or 2.5 μm, etc.

Illustratively, the first microstructure W1 protrudes above the light-exiting surface 2011.

Illustratively, the first microstructure W1 is formed as one-piece structure with the light guide plate 20.

By providing a plurality of first microstructures W1 on the light-exiting surface 2011 in the above-mentioned layout manner, multi-angle reflection and refraction of the light can be facilitated, thereby facilitating a uniformity in light distribution. As such, the backlight module BLU can achieve a multi-angle, high-efficiency light-emitting in a light-exiting area.

Figure 5B:
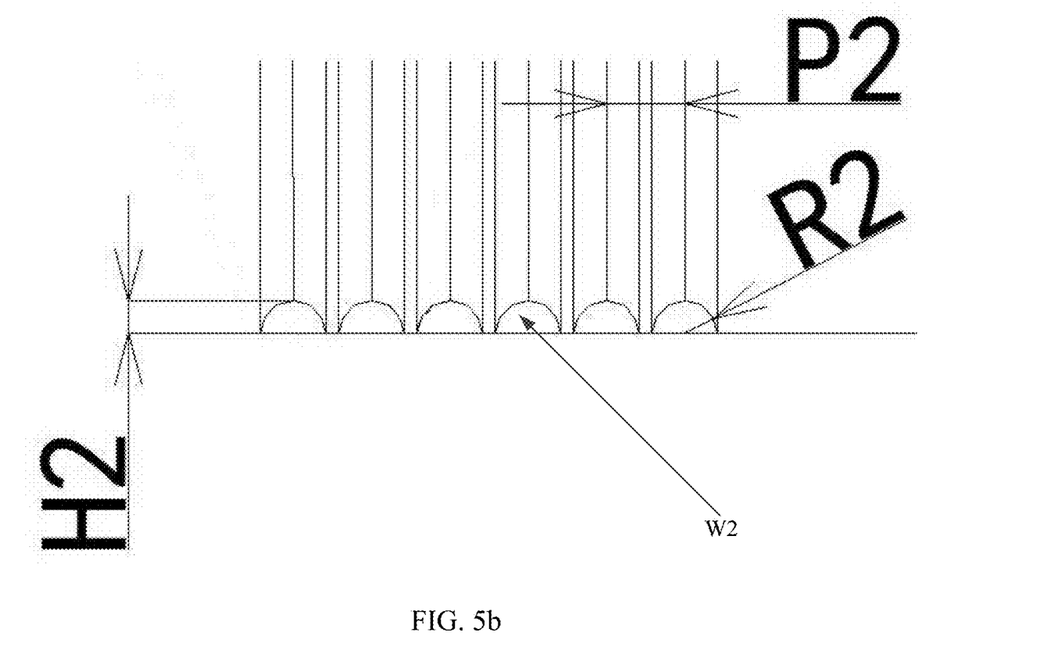
FIG. 5b is a schematic diagram of a size and a layout of second microstructures provided in an embodiment of the present disclosure.

As shown in FIGS. 2 and 5b, in some embodiments, the wedge surface 2021 is provided with multiple second microstructures W2, the multiple second microstructures W2 are arranged along a direction parallel to the wedge-structure light incident surface 2013, the second microstructures W2 on the wedge surface 2021 extends in a direction perpendicular to the direction along which the second microstructures W2 are arranged.

A cross section of the second microstructure W2, along the direction in which the second microstructures W2 are arranged and in the direction perpendicular to the wedge surface 2021, is a second arc shape, a radius R2 of the second arc shape satisfies: 80 $\mu m \leq R2 \leq 100$ $\mu m$.

A distance P2 between centers of two adjacent second microstructures W2 satisfies: 34 $\mu m \leq P2 \leq 44$ $\mu m$.

A maximum height H2 of the second microstructure W2 in the direction perpendicular to the wedge surface 2021 satisfies: 1.8 $\mu m \leq H2 \leq 2.2$ $\mu m$.

Illustratively, the radius R2 of the second arc shape may be: 85 $\mu m$, 90 $\mu m$ or 95 $\mu m$, etc.

Illustratively, the distance P2 between the centers of two adjacent second microstructures W2 may be: 35 $\mu m$, 36 $\mu m$, 37 $\mu m$, 38 $\mu m$, 39 $\mu m$, 40 $\mu m$, 41 $\mu m$, 42 $\mu m$, or 43 $\mu m$, etc.

Illustratively, the maximum height H2 of the second microstructure W2 in the direction perpendicular to the wedge surface 2021 may be: 1.9 $\mu m$, 2.0 $\mu m$ or 2.1 $\mu m$, etc.

Illustratively, the second microstructure W2 protrudes above the wedge surface 2021.

Illustratively, the second microstructure W2 is formed as one-piece structure with the light guide plate 20.

By arranging the multiple second microstructures in the above-mentioned layout manner, multi-angle reflection and refraction of the light can be realized, thereby facilitating the uniformity in the light distribution, so that the backlight module BLU can achieve multi-angle, high-efficiency light-emitting in the light-exiting area.

Figure 5C:
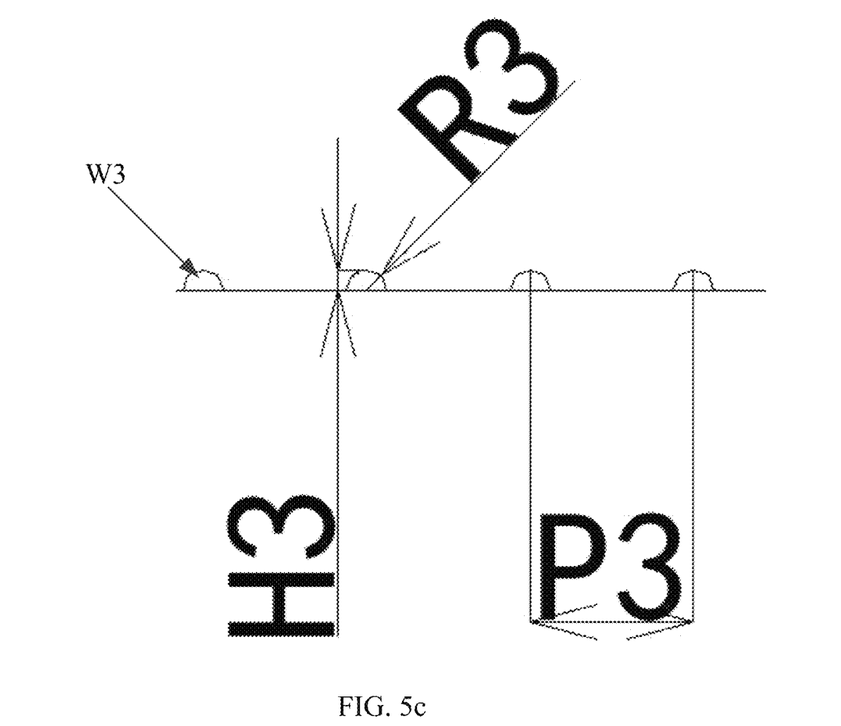
FIG. 5c is a schematic diagram of a size and a layout of third microstructures provided in an embodiment of the present disclosure.

As shown in FIGS. 2 and 5c, in some embodiments, the light incident surface 2023 of the wedge-shaped structure and the light incident surface 2013 of the body structure are coplanar, constituting a light incident surface of the light guide plate 20. The light incident surface of the light guide plate 20 is provided with multiple third microstructures W3, the multiple third microstructures W3 are arranged along a direction parallel to the light-exiting surface 2011 of the body structure, and the third microstructures W3 extend in a direction perpendicular to the direction in which the third microstructures W3 are arranged.

A cross section of the third microstructure W3, along the direction along which the third microstructures W3 are arranged and in a direction perpendicular to the light incident surface, is a third arc shape, a radius R3 of the third arc shape satisfies: 90 $\mu m \leq R3 \leq 110$ $\mu m$.

A distance P3 between centers of two adjacent third microstructures W3 satisfies: 340 $\mu m \leq P3 \leq 360$ $\mu m$.

A maximum height H3 of the third microstructure W3 in the direction perpendicular to the light incident surface satisfies: 29.5 $\mu m \leq H3 \leq 30.5$ $\mu m$.

Illustratively, the radius R3 of the third arc shape may be: 95 $\mu m$, 100 $\mu m$, 105 $\mu m$ or 110 $\mu m$, etc.

Illustratively, the distance P3 between the centers of two adjacent third microstructures W3 may be: 345 $\mu m$, 350 $\mu m$ or 355 $\mu m$, etc.

Illustratively, the maximum height H3 of the third microstructure W3 in the direction perpendicular to the light incident surface may be: 29.7 $\mu m$, 29.8 $\mu m$, 29.9 $\mu m$, 30 $\mu m$, or 30.2 $\mu m$, etc.

Illustratively, the third microstructure W3 protrudes above the light incident surface.

Illustratively, the third microstructure W3 is formed as one-piece structure with the light guide plate 20.

Arranging multiple third microstructures on the light incident surface in the above-mentioned layout manner is beneficial to the multi-angle reflection and refraction of the light, and is beneficial to the uniformity in the light distribution. As a result, the backlight module (BLU) can achieve a multi-angle, high-efficiency light entrance at the light incident surface, which is beneficial for improving the uniformity in the light emitted by the backlight module.

In some embodiments, P3>P2>P1.

The above-mentioned arrangement enables the lights emitted by the light source to be better reflected and refracted at multiple angles on the light incident surface, the wedge surface and the light-exiting surface, which can improve the uniformity of the light emitted by the backlight module.

Optionally, setting P3≥8P2, P2≥3P1.

Illustratively, the first microstructures W1, the second microstructures W2 and the third microstructures W3 are uniformly distributed on the surface on which they are located.

The above-mentioned arrangement enables the lights emitted by the light source to be better reflected and refracted at multiple angles on the light incident surface, the wedge surface and the light-exiting surface, which can improve the uniformity of the light emitted by the backlight module.

In some embodiments, in a direction parallel to the light-exiting surface of the body structure, a distance between the most distant two third microstructures W3 is greater than the total length of the light source 101.

The above-mentioned arrangement enhances the refractive index of the light guide plate in the corner region close to the light source, which is beneficial to improve the light brightness in the corner region and thereby addressing the dark shadow issue in the corner region.

Illustratively, the backlight module includes four corner regions, two of which are located at a side adjacent the light source and two of which are located at a side to opposite to the light.

Figure 6:
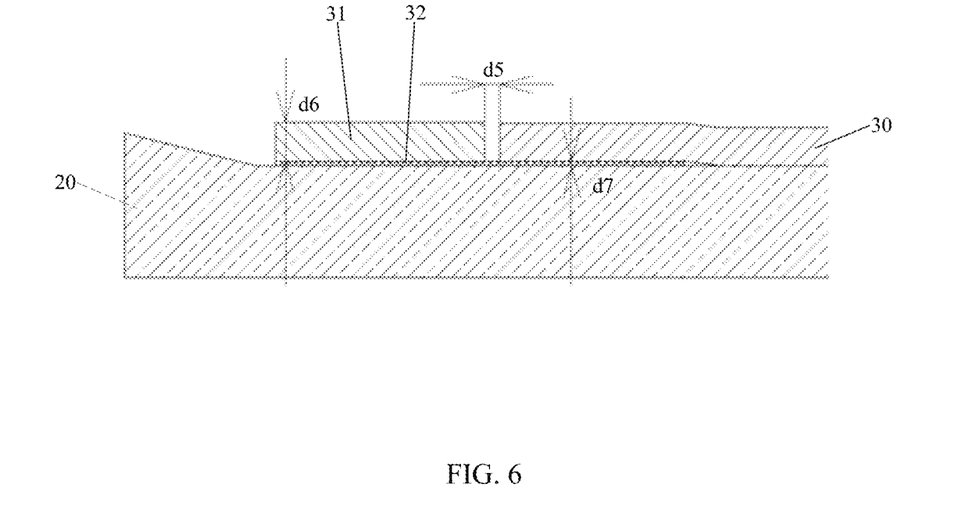
FIG. 6 is a schematic diagram of a support black bar, an optical film and a light-shielding film provided in an embodiment of the present disclosure.

As shown in FIGS. 1, 2 and 6, in some embodiments, the backlight module BLU further includes: an optical film 30, a support black bar 31 and a light-shielding film 32. The optical film 30 and the support black bar 31 are located on the light-exiting surface 2011 of the body structure 201, and at least a portion of the support black bar 31 is located between the wedge surface 2021 and the optical film 30. A first portion of the light-shielding film 32 is located between the support black bar 31 and the light-exiting surface 2011, and a second portion of the light-shielding film 32 is located between the optical film 30 and the light-exiting surface 2011.

A distance d5 between the optical film 30 and the support black bar 31 satisfies: 0≤d5≤0.1 mm.

A thickness d6 of the support black bar 31 satisfies: 0.12 mm≤d6≤0.15 mm.

A thickness d7 of the light-shielding film 32 satisfies: 0.013 mm≤d7≤0.017 mm.

Illustratively, 0.03≤d5≤0.07 mm; when d5 is 0 (there is no pitch), there is a risk of wrinkling for the optical film 30. When d5 is greater than 0.1 mm, the distance between the optical film 30 and the support black bar 31 is too large, since some lights will be transmitted due to the thin thickness of the light-shielding film, the large distance will result in that the lights emitted from the light guide plate will pass through the light-shielding film and directly enter the end face of the optical film 30, and then enter the display area along a groove of a prism of the optical film.

Illustratively, 0.12 mm≤d6≤0.135 mm. When d6 is less than the thickness of the optical film 30, there is a step difference between an upper surface of the support black bar 31 and an upper surface of the optical film 30, resulting in a gap between the support black bar 31 and the light-shielding glue 81, and further resulting in the light emitted from the light source entering the optical film from the side of the optical film through the gap. However, a prism layer in the optical film includes a plurality of prism protrusions, adjacent prism protrusions have a gap therebetween, and the lights entering the optical film from the side may transmit in the gaps and finally exit the backlight module and enter the display area of the display panel, resulting in a poor displaying. When d6 is greater than 0.15 mm, the segment difference between the support black bar and the optical film 30 may be too large, and the support black bar may lift up the light-shielding glue, resulting in a decrease in the adhesion effect between the optical film and the light-shielding glue, which may in turn results in an easy separation of the light-shielding glue from the optical film after testing, and the lamp port effect cannot pass.

Optionally, the thickness of d6 is the same as the thickness of optical film 30.

Illustratively, the optical film 30 has a thickness of between 0.108 mm and 0.128 mm. Alternatively, the optical film 30 has a thickness between 0.112 mm and 0.132 mm.

Note that the light-shielding glue 81 is used for bonding the display panel and the backlight module.

Illustratively, 0.0145 mm≤d7≤0.0155 mm; when d7 is too small, the light of the light guide plate easily passes through the light-shielding film to enter the optical film. When the thickness of d7 is too large, there is a hole between the optical film and the light guide plate at the end of the light-shielding film near the light-exiting area, which affects the lamp port effect.

Illustratively, the distance d5 between the optical film 30 and the support black bar 31 may be: 0.03 mm, 0.05 mm, 0.07 mm, or 0.09 mm, etc.

Illustratively, the thickness d6 of the support black bar 31 may be: 0.13 mm, or 0.14 mm, etc.

Illustratively, the thickness d7 of the light-shielding film 32 may be: 0.014 mm, 0.015 mm, or 0.016 mm, etc.

Illustratively, the optical film 30 includes three layers in one film, namely, an upper prism, a lower prism and a diffusion film, the lower prism is located between the upper prism and the diffusion film, the diffusion film is close to the light-exiting surface 2011, and the upper prism is away from the light-exiting surface 2011.

Illustratively, the support black bar 31 has a supporting and shading function for supporting the light-shielding glue 81. The provision of the support black bar can prevent the light guide plate from directly adhering to the light-shielding glue 81.

Since the thickness of the light-shielding film 32 is thin, the light-shielding film 32, the support black bar 31 and the optical film 30 are formed together into an integral structure. If the support black bar is not provided, the light-shielding film 32 cannot smoothly protrude out of the optical film 30 in height. Therefore, if the support black bar is not provided, the light-shielding film 32 is generally not provided at a position corresponding to the support black bar 31.

Note that a surface of the light-shielding film 32 facing the light guide plate is not adhesive, and a surface of the light-shielding film 32 facing away from the light guide plate is adhesive, so that the optical film is not pulled through the light-shielding film 32 by the light guide plate when the light guide plate expands or contracts.

If the support black bar 31 is removed, the light-shielding film 32 is not disposed at the position corresponding to the support black bar 31, this would result in a direct bonding between the light guide plate and the light-shielding glue 81, and when the light guide plate expands and contracts, the optical film would be pulled through the light-shielding glue 81, affecting the yield of the backlight module.

Illustratively, the support black bar 31 is not in contact with the wedge surface 2021: alternatively, the support black bar 31 is in contact with the wedge surface 2021. Preferably, the support black bar 31 do not contact with the wedge surface 2021, so that a floating of the support black bar 31 at the corner between the wedge surface and the body structure light-exiting surface can be avoided.

Illustratively, the light-shielding film 32 includes a light shielding resin such as shielding PET.

Illustratively, at least a portion of the light-shielding film 32 is located between the wedge surface 2021 and the light-exiting area of the backlight module BLU. Illustratively, the light-shielding film 32 is located at a side of the light-exiting area VA of the light guide plate and adjacent to the side of the light source, and a distance between the light-shielding film 32 and the light-exiting area VA is about 0.1 mm, and this arrangement can avoid dark shadow on the side of the light-exiting area near the light source. Illustratively, the boundary of the light-shielding film 32 may also coincide with the boundary of the light-exiting area VA.

The above-mentioned arrangement enables the light emitted in the non-light-exiting area of the backlight module BLU to be blocked by the support black bar 31 and the light-shielding film 32, and prevents the light emitted from the non-light-exiting area from directly emitting to an end face of the optical film 30, thereby addressing the issue that light may be emitted from the lamp port.

Furthermore, setting d5 and d6 in the above-mentioned range can better reduce the overall thickness of the backlight module BLU. Setting d5 in the above-mentioned range can better addressing the issue that light may be emitted from the lamp port.

As shown in FIGS. 1 and 2, in some embodiments, the backlight module BLU further includes a reflective sheet 33.

The reflective sheet 33 is located at a side of the body structure 201 facing away from the light-exiting surface 2011.

A first portion of the carrier 102 is located at a side of the body structure 201 facing away from the light-exiting surface 2011, and a distance d8 between an orthographic projection of the first portion of the carrier 102 onto the body structure 201 and an orthographic projection of the reflective sheet 33 onto the body structure 201 satisfies: 0.1 mm≤d8≤0.3 mm.

Illustratively, the distance d8 between the orthographic projection of the first portion of the carrier 102 onto the body structure 201 and the orthographic projection of the reflective sheet 33 onto the body structure 201 may be: 0.15 mm, 0.2 mm, or 0.25 mm, etc.

Illustratively, the reflective sheet 33 is bonded to a housing of the backlight module BLU by a reflective back glue 39. Illustratively, the boundary of the reflective sheet 33 facing the light source 101 is flush with the boundary of the reflective back glue 39 facing the light source 101.

By setting d8 in the above-mentioned range, the orthographic projection of the reflective sheet 33 onto the light-exiting surface 2011 can at least partially overlap with the orthographic projection of the light-shielding film 32 onto the light-exiting surface 2011. Preferably, the reflective sheet 33 can block the non-light-exiting surface 2012 to the largest extent, which is beneficial to improve the light emitting efficiency of the backlight module BLU and improve the brightness of light emitted by the backlight module BLU.

Setting d8 in the above-mentioned range can addressing an issue of light interference due to a close distance between the reflective sheet 33 and the carrier 102.

As shown in FIGS. 1 and 2, in some embodiments, the backlight module BLU further includes a housing 34 and a mold frame 35.

The light source structure, the light guide plate 20 and the reflective sheet 33 are all located inside the housing 34, and an opening of the housing 34 faces to the light-exiting side of the backlight module BLU. A thickness d9 of a bottom of the housing 34 satisfies: 0.065 mm≤d9≤0.075 mm.

At least a portion of the mold frame 35 and the light source structure is located on the same side of the light guide plate 20, the mold frame 35 is fixed to the housing 34, a flatness of a middle portion of the mold frame 35 is less than 0.15 mm, and a flatness of an edge portion of the mold frame 35 is less than 0.35 mm.

Illustratively, the housing 34 includes an iron frame.

Illustratively, the carrier 102 is adhered to the bottom of the housing 34 by a light bar glue 38.

Illustratively, the thickness d9 of the housing 34 may be 0.067 mm, 0.069 mm, 0.070 mm, 0.072 mm, or 0.074 mm, etc.

Illustratively, the light source 101 is located between the light guide plate 20 and at least a portion of the mold frame 35.

As shown in FIG. 8, it should be noted that A represents the edge portion of the mold frame 35, and an upward warping of the edge is referred to as a bowl warping, this warping is generally represented by a negative value, e.g. −0.35 mm, which represents a maximum possible upward warping to be 0.35 mm. B represents an upward arch at the middle portion of the middle area of the mold frame 35, which is also called a turtle warping, this warping is generally represented by a positive value, +0.15 mm, representing a maximum possible upward arch to be 0.15 mm. The flatness refers to a degree of warping or arch.

It should be noted that when measuring the flatness of the mold frame 35, the mold frame 35 may be placed on a marble having a flat surface and measured on a table. There is no clear boundary between the edge portion and the middle portion of the mold frame, and a region where the bowl warping can occur is the edge region, and a region where the turtle warping can occur is the middle portion.

Illustratively, the flatness of the middle portion of the backlight module BLU is less than 0.1 mm, and the flatness of the edge portion of the backlight module BLU is less than 0.3 mm. The definition of the flatness of the backlight module BLU is the same as the definition of the flatness of the mold frame, and the description thereof will not be repeated here.

By setting d9 in the above-mentioned range, setting the flatness of the mold frame 35 in the above-mentioned range, and setting the flatness of the backlight module BLU in the above-mentioned range, not only the overall thickness of the backlight module BLU can be reduced, but also the influence of warping of the housing and the light guide plate 20 on the light efficiency of the module and the reliability of the structure during environmental testing can be avoided.

In the backlight module BLU provided in the embodiment, the overall thickness X3 can be reduce to be between 0.5 mm and 0.6 mm, such that the thickness of the backlight module BLU can be effectively reduced. Illustratively, the thickness of the backlight module BLU is reduced to 0.575 mm.

Note that, as shown in FIG. 1, the backlight module BLU may further include a strong/weak glue 36, an edge-covering glue 37 and a graphite sheet 40.

The strong/weak glue 36 is located at the side of the backlight module on which the light source is provided, and the adhesive strengths of two sides of the strong/weak glue 36 is different, and the adhesive strength at one side adhered to the display panel is weak, thereby reducing the repair difficulty.

The edge-covering glue 37 is located the side of the backlight module on which the light source is provided, and covers at least a portion of the light-shielding glue 81, at least a portion of the housing 34 and at least a portion of the graphite sheet 40, so as to improve the firmness of adhesion.

The graphite sheet 40 is located on the side of the backlight module on which the light source is provided, and is located on the side of the housing 34 facing away from the light source.

In some embodiments, the thickness of the light source is set to be 0.4 mm in a direction perpendicular to the carrier. d1=0.26 mm. d2=0.29 mm. d3=0.4 mm. d4=1.57 mm. F=0.02 mm. 0.03 mm for the light-shielding glue. The thickness of the bottom of the housing is 0.07 mm. R2=90 µm, P2=39 µm, H2=2 µm. R1=90 µm, P1=150 µm, H1=2.4 µm. R3=100 µm, P3=350 µm, H3=3 µm.

The above-mentioned arrangement can effectively reduce the overall thickness of the backlight module BLU, can ensure the light incident rate at the light incident surface of the light guide plate, and ensure that the wedge-shaped structure 202 is well matched with the size of the light outlet of the light source 101. The wedge-shaped structure 202 can be made to match with the size of the light outlet of the light source 101. In addition, with the above-mentioned arrangement, a segment difference between the wedge surface 2021 and the light-exiting surface 2011 can be controlled to be within a reasonable range, so that the light emitted by the light source 101 will not be emitted to the light-exiting surface 2011 of the light guide plate 20 in large amount before entering the light-exiting area VA of the backlight module BLU, this can ensure an optimal lamp port effect, and an uneven brightness and darkness will not occur at the lamp port. Furthermore, the backlight module BLU is enabled to realize multi-angle, high-efficiency light entrance at light incident surface. The amount of light emitted from the wedge surface 2021 can be reduced, so that the backlight module BLU can realize a multi-angle, high-efficiency light-emitting in the light-exiting area. The multi-angle, high-efficiency light-exiting can be realized at the light-exiting area of the backlight module BLU.

In some embodiments, a ratio of the thickness of the body structure 201 to the overall thickness of the light source 101 is less than or equal to 75%.

In the backlight module BLU provided in the above-mentioned embodiment, by arranging the light guide plate 20 to include the wedge-shaped structure 202 and the body structure 201, in the direction perpendicular to the bottom surface 2022, the ratio of the thickness of the body structure to the thickness of the light-exiting surface of the light source to be less than 88%, and the ratio of the thickness of the body structure 201 to the overall thickness of the light source to be is less than or equal to 75%, the light emitted by the light source can enter the wedge-shaped structure 202 to a greater extent and then is further transmitted from the wedge-shaped structure to the body structure. Therefore, the light incidence rate at the light incident surface of the light guide plate can be ensured, the light utilization rate can be improved, and the wedge-shaped structure 202 can be well matched with the size of the light outlet of the light source 101.

In some embodiments, on the light-exiting side of the light guide plate 20, the light-exiting surface of the light source protrudes with respect to the wedge-shaped structure 202; and/or on a non-light-exiting side of the light guide plate 20 opposite to the light-exiting side, the light-exiting surface of the light source protrudes with respect to the body structure 201.

The above-mentioned arrangement ensures the light incidence rate at the light incident surface of the light guide plate, improves the light utilization rate, and ensures that the wedge-shaped structure 202 can be well matched with the size of the light outlet of the light source 101.

Figure 9:
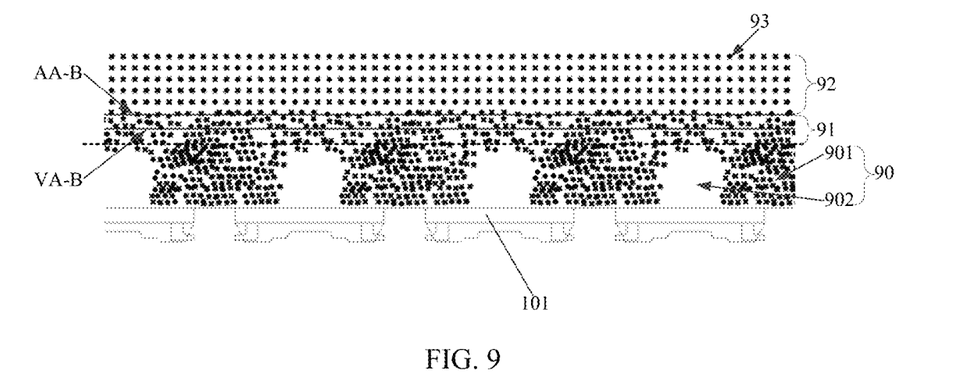
FIG. 9 is a schematic diagram of dot distribution provided in an embodiment of the present disclosure.

As shown in FIG. 9, on the non-light-exiting surface 2012 of the wedge-shaped structure 202, the body structure 201 includes a first region 90 and a second region, which are disposed to be adjacent to the light source 101 in an extending direction of light source 101 arrangement: where an extension direction of a boundary line between the first region 90 and the second region is the same as the extending direction of light source 101 arrangement.

The first region 90 includes a plurality of arch regions 902 disposed along the direction of the light source 101 arrangement, each of the arch regions 902 corresponds to a corresponding light source 101 on a one-to-one basis, a bottom of the arch region is disposed to be adjacent to the light source 101, and an orthographic projection of two arch feet of the arch region 902 onto the light-exiting surface of the light source 101 is located inside the light-exiting surface. In the first region 90, an average density of dots in the arch region 902 is less than an average density of dots in a region outside the arch region 902.

Dots may or may not be provided in the arch region 902 as desired. Preferably, no dot is provided in the arch region 902.

In some embodiments, the second region further includes a first sub-region 91 and a second sub-region 92, the first sub-region 91 is located between the first region 90 and the second sub-region 92, an average density of dots in the first sub-region 91 is greater than an average density of dots in the second sub-region 92.

In particular, the first region includes an intersection region, the arch region 902 includes a bright region, the region outside the arch region 902 includes a dark region, the first sub-region includes a light-mixing region, and the second sub-region includes a visible region.

Illustratively, the dot 93 includes a hemispherical structure having a diameter of between 0.036 mm and 0.040 mm. Whether the dots are evenly distributed or not can be set according to actual needs.

Note that the boundary AA-B of the visible area 92 are also illustrated in FIG. 9. The boundary AA-B of the visible area 92 refers to an orthographic projection of a border of the display area of the display panel onto the backlight module.

Illustratively, the arch region 902 is located between VA-B and light source 101, and VA-B is located between AA-B and the arch region 902.

With the above-mentioned arrangement, sparse dots can be arranged in the area directly opposite to the light-exiting surface of the light source 101, and dense dots can be arranged in the area between adjacent light sources 101, so that weak light intensity between adjacent light sources 101 can be compensated, thereby addressing an issue that the brightness of light emitted along the direction of light source arrangement is not uniform. In addition, the dots are evenly distributed in the visible area 92, which is beneficial for improving the uniformity in the light emitted by the backlight module.

Various verifications have been done by the inventor.

Verification scheme 1: $d2=0.36$ mm, $d1=0.26$ mm, $F=0.1$ mm and the thickness of the light source in the direction perpendicular to the carrier is 0.4 mm. Results: a significant lamp eye exits at the lamp port due to the concentration of secondary reflected light.

Validation scheme 2: $d2=0.36$ mm, $d3=1$ mm. The thickness of the support black bar is 0.075 mm, the boundary of the light-shielding film near the light-exiting area VA is flush with the boundary of the light-exiting area VA, and the others are conventional designs. Results: there is a serve lamp eye phenomenon with bright lines due to secondary reflected light.

Verification scheme 3: $d2=0.36$ mm, $d3=1$ mm. The thickness of the support black bar is 0.075 mm, the light-mixing distance is 0.1 mm, the boundary of the light-shielding film near the light-exiting area VA is flush with the boundary of the light-exiting area VA, and the others are conventional designs. Results: there is a serve lamp eye phenomenon, the lamp port is bright, and a region in front of the light source is dark.

Verification scheme 4: $d2=0.29$ mm, $d3=1$ mm. The thickness of the support black bar is 0.075 mm, the light-mixing distance is 0.1 mm, the boundary of the light-shielding film near the light-exiting area VA is flush with the boundary of the light-exiting area VA, and the others are conventional designs. Results: there is a slight lamp eye phenomenon, a slight bright bar before the lamp, and high brightness at two corner regions.

Verification scheme 5: $d2=0.38$ mm, $d3=1.4$ mm. The thickness of the support black bar is 0.075 mm, the light-mixing distance is 0.1 mm, the boundary of the light-shielding film near the light-exiting area VA is flush with the boundary of the light-exiting area VA, and the others are conventional designs. Results: the lamp eye phenomenon at the lamp port is obvious.

Verification scheme 6: $d2=0.34$ mm, $d3=0.4$ mm. The thickness of the support black bar is 0.075 mm, the light-mixing distance is increased to 0.1 mm, the boundary of the light-shielding film near the light-exiting area VA is flush with the boundary of the light-exiting area VA, and the others are conventional designs. Results: the lamp eye phenomenon at the lamp port is obvious.

Verification scheme 7: d2=0.36 mm, d3=0.4 mm. The thickness of the support black bar is 0.075 mm, the light-mixing distance is increased to 0.1 mm, the boundary of the light-shielding film near the light-exiting area VA is flush with the boundary of the light-exiting area VA, and the others are conventional designs. Results: brightness and darkness are uneven, there is a bright band and a lamp eye.

Verification scheme 8: d2=0.29 mm, d3=0.4 mm. The thickness of the support black bar is 0.075 mm, the others are of conventional design. Results: the vertical shadow is basically eliminated, there is no abnormal lamp eye at the lamp port, there is no uneven brightness and darkness and no bright band, which has good lamp port effect.

In some embodiments, the body structure 201 and the wedge-shaped structure 202 are formed as one-piece structure.

The above-mentioned arrangement enables the body structure 201 and the wedge-shaped structure 202 to be formed integrally, which not only helps to reduce manufacturing costs and ensure manufacturing accuracy, but also improves the light guiding effect of the light guide plate.

In some embodiments, the light incident surface 2023 of the wedge-shaped structure and the light incident surface 2013 of the body structure are a continuous surface. The continuous surface refers to that the light incident surface 2023 of the wedge-shaped structure and the light incident surface 2013 of the body structure are formed as an integral structure, and the light incident surface 2023 of the wedge-shaped structure and the light incident surface 2013 of the body structure smoothly transitions at the joint.

The above-mentioned arrangement can ensure the uniformity in the light incident at the light incident surface of the light guide plate, and avoid the excessive reflection.

As shown in FIGS. 7 and 8, an embodiment of the present disclosure further provides a display device, including a backlight module (BLU) as provided in the above-mentioned embodiments, and the display device further includes a display panel 80, where the display panel 80 is located at the light-exiting side of the backlight module (BLU).

The backlight module BLU is configured for providing a backlight source for the display panel 80.

It is to be noted that the display device may be: any product or component with a display function, such as a television, a display, a digital photo frame, a mobile phone, a tablet computer, and among others, the display device further includes a flexible circuit board, a printed circuit board and a back panel.

In the backlight module BLU provided in the above-mentioned embodiments, by arranging the light guide plate 20 to include the wedge-shaped structure 202 and the body structure 201, the overall thickness of the backlight module BLU can be effectively reduced by thinning the body structure 201 in the direction perpendicular to the bottom surface 2022.

In addition, in the backlight module BLU provided in the above-mentioned embodiments, by arranging that: the light guide plate 20 includes the wedge-shaped structure 202 and the body structure 201: in the direction perpendicular to the bottom surface 2022, the ratio of the thickness of the body structure 201 to the thickness of the light source 101 to be less than 75%: at the light-exiting side of the light guide plate 20, the light source 101 to protrude with respect to the wedge-shaped structure 202; and at the side of the light guide plate 20 opposite to the light-exiting side, the light source 101 to protrude with respect to the body structure 201, with such arrangement, an orthographic projection of two opposite boundaries of the light incident surface 2023 of the wedge-shaped structure, which are in the direction perpendicular to the light-exiting surface of the body structure, onto the light-exiting surface of the light source 101 is located between two opposite boundaries of the light-exiting surface of the light source 101, which are in the direction perpendicular to the light-exiting surface of the body structure, so that the light emitted by the light source can enter the wedge-shaped structure 202 to a greater extent, and then is further transmitted from the wedge-shaped structure to the body structure, thereby ensuring the light incident rate at the light incident surface of the light guide plate, improving the light utilization rate, and ensuring that the wedge-shaped structure 202 can well match the size of the light emergent opening of the light source 101.

The display device provided by the embodiments of the present disclosure also has the above-mentioned advantageous effects when including the above-mentioned backlight module, and the description thereof will not be repeated here.

In the various method embodiments of the present disclosure, the serial number of each step cannot be used to define the order of each step, and for a person of ordinary skill in the art, without involving any inventive effort, changes in the order of each step are also within the scope of the present disclosure.

It should be noted that the various embodiments described herein are described in a progressive manner, the same or similar parts throughout the various embodiments can be referred to each other, with each embodiment focusing on the difference from the other embodiments. In particular, the method embodiments are described more simply because they are substantially similar to the product embodiments, with reference to the partial description of the product embodiments.

Unless defined otherwise, technical or scientific terms used in this disclosure shall have the ordinary meaning as understood by one of ordinary skill in the art to which this disclosure belongs. The terms "first", "second", and the like as use herein do not denote any order, quantity, or importance, but rather are used to distinguish one element from another. The terms "include" or "comprise", and the like, means that the presence of an element or item preceding the word covers the presence of the element or item listed after the word and equivalents thereof, but does not exclude other elements or items. The terms "connect", "couple" or "link" and the like are not limited to physical or mechanical connections, but may include electrical connections, whether direct or indirect. The terms "upper", "lower", "left", "right" and the like are used only to indicate relative positional relationships that may change accordingly when the absolute position of the object being described changes.

It will be understood that when an element such as a layer, film, region or substrate is referred to as being "on" or "under" another element, it can be "directly on" or "directly under" the other element or intervening elements may be present.

In the description of the embodiments above, particular features, structures, materials, or characteristics may be combined in any suitable manner in any one or more embodiments or examples.

While the present disclosure has been described with reference to specific embodiments thereof, it will be understood by those skilled in the art that various changes may be made and equivalents may be substituted for elements thereof without departing from the scope of the disclosure. Accordingly, the protection scope of this disclosure is as set forth in the appended claims.

What is claimed is:

1. A backlight module, comprising: a light source structure and a light guide plate;
   wherein the light guide plate comprises a body structure and a wedge-shaped structure, the wedge-shaped structure is disposed on the body structure and located at a side adjacent to the light source structure;
   the body structure comprises a light incident surface of the body structure; the wedge-shaped structure comprises a bottom surface, a wedge surface and a light incident surface of the wedge-shaped structure, the bottom surface is disposed in surface contact with the body structure; the light incident surface of the wedge-shaped structure, the wedge surface and the bottom surface form a protrusion on the body structure, and a thickness of the wedge-shaped structure gradually decreases in a direction from the light incident surface of the body structure, extending along the body structure and away from the light source structure; and
   the light source structure comprises a light source and a carrier carrying the light source; the light incident surface of the body structure is located at a side of the body structure facing the light source, and the light incident surface of the wedge-shaped structure is located at a side of the wedge-shaped structure facing the light source; a light emitted by the light source enter the light guide plate through the light incident surface of the body structure and the light incident surface of the wedge-shaped structure; in a direction perpendicular to the bottom surface, a ratio of a thickness of the body structure to a thickness of a light-exiting surface of the light source is less than or equal to 88%.

2. The backlight module according to claim 1, wherein in a direction perpendicular to a light-exiting surface of the body structure, a maximum thickness d1 of the body structure satisfies: 0.24 mm≤ d1≤0.32 mm; and
   a distance d4 between the light incident surface of the body structure and a boundary of a light-exiting area of the backlight module satisfies: d4≤1.65 mm.

3. The backlight module according to claim 2, wherein in the direction perpendicular to the bottom surface, a maximum thickness F of the wedge-shaped structure satisfies: F≤0.04 mm;
   in the direction perpendicular to the light-exiting surface of the body structure, a maximum thickness d2 of the light guide plate satisfies: 0.27 mm≤ d2≤0.33 mm;
   a length d3 of an orthographic projection of a first edge of the wedge surface onto the bottom surface satisfies: 0.3 mm≤ d3≤0.55 mm, and an included angle between the first edge and the light incident surface of the wedge-shaped structure is greater than 0 degrees; and
   an included angle Z between the wedge surface and the bottom surface satisfies: Z≤4.5 degrees.

4. The backlight module according to claim 1, wherein a plurality of first microstructures is disposed on the light-exiting surface of the body structure, the plurality of first microstructures is arranged along a direction parallel to the light incident surface of the body structure, and each of the plurality of first microstructures on the light-exiting surface of the body structure extends in a direction that is perpendicular to a direction for arranging the plurality of the first microstructures;
   a cross section of the first microstructure, along the direction for arranging the plurality of the first microstructures and in the direction perpendicular to the light-exiting surface, has a first arc shape, and a radius R1 of the first arc shape satisfies: 80 μm≤R1≤100 μm;
   a distance P1 between centers of two adjacent first microstructures satisfies: 140 μm≤P1≤ 160 μm; and
   in the direction perpendicular to the light-exiting surface, a maximum height H1 of the first microstructure satisfies: 2.2 μm≤H1≤2.6 μm.

5. The backlight module according to claim 4, wherein a plurality of second microstructures is disposed on the wedge surface, the plurality of second microstructures is arranged in a direction parallel to the light incident surface of the wedge-shaped structure, and the second microstructure on the wedge surface extends in a direction that is perpendicular to a direction for arranging the plurality of second microstructures;
   a cross section of the second microstructure, along the direction for arranging the plurality of second microstructures and in a direction perpendicular to the wedge surface, has a second arc shape, a radius R2 of the second arc shape satisfies: 80 μm≤R2≤100 μm;
   a distance P2 between centers of two adjacent second microstructures satisfies: 34 μm≤P2≤ 44 μm; and
   in the direction perpendicular to the wedge surface, a maximum height H2 of the second microstructure satisfies: 1.8 μm≤H2≤2.2 μm.

6. The backlight module according to claim 5, wherein the light incident surface of the wedge-shaped structure and the light incident surface of the body structure are coplanar to be a light incident surface of the light guide plate; a plurality of third microstructures is disposed on the light incident surface of the light guide plate, the plurality of third microstructures is arranged in a direction parallel to the light-exiting surface of the body structure, and the third microstructure extend in a direction that is perpendicular to a direction for arranging the plurality of third microstructures;
   a cross section of the third microstructure, along the direction for arranging the plurality of third microstructures and in a direction perpendicular to the light incident surface has a third arc shape, a radius R3 of the third arc shape satisfies: 90 μm≤R3≤110 μm;
   a distance P3 between centers of two adjacent third microstructures satisfies: 340 μm≤P3≤ 360 μm; and
   in the direction perpendicular to the light incident surface, a maximum height H3 of the third microstructure satisfies: 29.5 μm≤H3≤30.5 μm.

7. The backlight module according to claim 6, wherein P3>P2>P1.

8. The backlight module according to claim 1, wherein the backlight module further comprises: an optical film, a support black bar and a light-shielding film; the optical film and the support black bar are located on a light-exiting surface of the body structure, and at least a portion of the support black bar is located between the wedge surface and the optical film; a first portion of the light-shielding film is located between the support black bar and the light-exiting surface, and a second portion of the light-shielding film is located between the optical film and the light-exiting surface;
   a distance d5 between the optical film and the support black bar satisfies: 0≤ d5≤0.1 mm;
   a thickness d6 of the support black bar satisfies: 0.12 mm≤ d6≤0.15 mm; and
   a thickness d7 of the light-shielding film satisfies: 0.013 mm≤ d7≤0.017 mm.

9. The backlight module according to claim 1, wherein the backlight module further comprises:
   a reflective sheet, located at a side of the body structure facing away from the light-exiting surface; and wherein a first portion of the carrier is located at the side of the body structure facing away from the light-exiting surface, and a distance d8 between an orthographic projection of the first portion of the carrier onto the body structure and an orthographic projection of the reflective sheet onto the body structure satisfies: 0.1 mm≤ d8≤0.3 mm.

10. The backlight module according to claim 9, wherein the backlight module further comprises:
a housing, wherein the light source structure, the light guide plate and the reflective sheet are located inside the housing, and an opening of the housing faces to a light-exiting side of the backlight module; a thickness d9 of a bottom of the housing satisfies: 0.065 mm≤ d9≤0.075 mm; and
a mold frame, wherein at least a portion of the mold frame and the light source structure are located at a same side of the light guide plate, the mold frame is bonded to the housing, a flatness of a middle portion of the mold frame is less than 0.15 mm, and a flatness of an edge portion of the mold frame is less than 0.35 mm.

11. The backlight module according to claim 1, wherein the body structure and the wedge-shaped structure are one-piece structure.

12. The backlight module according to claim 1, wherein the light incident surface of the wedge-shaped structure and the light incident surface of the body structure are a continuous surface.

13. The backlight module according to claim 1, wherein at least a portion of the carrier is located at a side of the body structure facing away from the bottom surface.

14. The backlight module according to claim 1, wherein a ratio of a thickness of the body structure to an overall thickness of the light source is less than or equal to 75%.

15. The backlight module according to claim 1, wherein at a light-exiting side of the light guide plate, the light-exiting surface of the light source protrudes with respect to the wedge-shaped structure; and/or at a non-light-exiting side of the light guide plate opposite to the light-exiting side, the light-exiting surface of the light source protrudes with respect to the body structure.

16. The backlight module according to claim 1, wherein on a non-light-exiting surface of the body structure facing away from the wedge-shaped structure, the body structure comprises a first region and a second region disposed to be adjacent to the light source in a direction away from an extending direction of light source arrangement; wherein an extending direction of a boundary line between the first region and the second region is the same as the extending direction of light source arrangement; and
the first region comprises a plurality of arch regions disposed along a direction of arrangement, each arch region is in one-to-one correspondence to a corresponding light source, a bottom of the arch region is disposed to be adjacent to the light source, and orthographic projections of two arch feet of the arch region onto the light-exiting surface of the light source is located inside the light-exiting surface; in the first region, an average density of dots in the arch region is less than an average density of dots in a region outside the arch region.

17. The backlight module according to claim 16, wherein the second region further comprises a first sub-region and a second sub-region, the first sub-region is located between the first region and the second sub-region, and an average density of dots in the first sub-region is greater than an average density of dots in the second sub-region.

18. A display device, comprising a backlight module and a display panel, wherein the display panel is located at a light-exiting side of the backlight module;
wherein the backlight module comprises a light source structure and a light guide plate;
wherein the light guide plate comprises a body structure and a wedge-shaped structure, the wedge-shaped structure is disposed on the body structure and located at a side adjacent to the light source structure;
the body structure comprises a light incident surface of the body structure; the wedge-shaped structure comprises a bottom surface, a wedge surface and a light incident surface of the wedge-shaped structure, the bottom surface is disposed in surface contact with the body structure; the light incident surface of the wedge-shaped structure, the wedge surface and the bottom surface form a protrusion on the body structure, and a thickness of the wedge-shaped structure gradually decreases in a direction from the light incident surface of the body structure, extending along the body structure and away from the light source structure; and
the light source structure comprises a light source and a carrier carrying the light source; the light incident surface of the body structure is located at a side of the body structure facing the light source, and the light incident surface of the wedge-shaped structure is located at a side of the wedge-shaped structure facing the light source; a light emitted by the light source enter the light guide plate through the light incident surface of the body structure and the light incident surface of the wedge-shaped structure; in a direction perpendicular to the bottom surface, a ratio of a thickness of the body structure to a thickness of a light-exiting surface of the light source is less than or equal to 88%.

19. The display device according to claim 18, wherein in a direction perpendicular to a light-exiting surface of the body structure, a maximum thickness d1 of the body structure satisfies: 0.24 mm≤ d1≤0.32 mm; and
a distance d4 between the light incident surface of the body structure and a boundary of a light-exiting area of the backlight module satisfies: d4≤1.65 mm.

20. The display device according to claim 18, wherein a plurality of first microstructures is disposed on the light-exiting surface of the body structure, the plurality of first microstructures is arranged along a direction parallel to the light incident surface of the body structure, and each of the plurality of first microstructures on the light-exiting surface of the body structure extends in a direction that is perpendicular to a direction for arranging the plurality of the first microstructures;
a cross section of the first microstructure, along the direction for arranging the plurality of the first microstructures and in the direction perpendicular to the light-exiting surface, has a first arc shape, and a radius R1 of the first arc shape satisfies: 80 μm≤R1≤100 μm;
a distance P1 between centers of two adjacent first microstructures satisfies: 140 μm≤P1≤160 μm; and
in the direction perpendicular to the light-exiting surface, a maximum height H1 of the first microstructure satisfies: 2.2 μm≤H1≤2.6 μm.

* * * * *